United States Patent [19]
Bauer et al.

[11] Patent Number: 4,510,821
[45] Date of Patent: Apr. 16, 1985

[54] DEVICE FOR MAKING A FIRM, BUT RELEASABLE JOINT BETWEEN A STEERING WHEEL AND A LOCKING BOLT

[75] Inventors: Wolfgang Bauer, Karlsting; Werner Grosser, Sulzbach, both of Fed. Rep. of Germany

[73] Assignee: Karl Schmidt GmbH, Neckarsulm, Fed. Rep. of Germany

[21] Appl. No.: 534,932

[22] Filed: Sep. 23, 1983

Related U.S. Application Data

[63] Continuation of Ser. No. 207,096, Nov. 14, 1980, abandoned.

[30] Foreign Application Priority Data

Nov. 14, 1979 [DE] Fed. Rep. of Germany ....... 2945937

[51] Int. Cl.³ .............................................. B62D 1/04
[52] U.S. Cl. ......................................... 74/552; 70/252
[58] Field of Search .................... 74/552; 70/252, 209, 70/210, 211

[56] References Cited

U.S. PATENT DOCUMENTS 1,783,971 12/1930 Miquet ................................... 70/209
3,553,987 1/1971 Ball et al. .............................. 70/252

FOREIGN PATENT DOCUMENTS 2711701 9/1978 Fed. Rep. of Germany .
702484 3/1966 Italy ..................................... 70/252

Primary Examiner—Kenneth J. Dorner
Attorney, Agent, or Firm—Sprung Horn Kramer & Woods

[57] ABSTRACT

A device is provided for making a firm but releasable joint between a steering wheel which is connected to the steering column and a locking bolt that is movable by means of a lock cylinder.

In order to provide between the hub of the steering hub and the locking bolt a joint which cannot be forcibly released from the outside, the diecast steering wheel hub is pot-shaped on the side facing the steering column and its cylindrical flange which in concentric to the steering column is provided on its inside periphery with a multiplicity of axial grooves for receiving the locking bolt. A metal ring is provided in front of the end faces of the grooves and is firmly connected to the land disposed between the grooves.

1 Claim, 2 Drawing Figures

DEVICE FOR MAKING A FIRM, BUT RELEASABLE JOINT BETWEEN A STEERING WHEEL AND A LOCKING BOLT

This application is a continuation of application Ser. No. 207,096, filed Nov. 14, 1980 and now abandoned.

This invention relates to a device for making a firm, but releasble joint between a steering wheel, which is connected to the steering column, and a locking bolt, which is movable by a lock cylinder.

In known devices, the locking bolt is movable by means of a lock cylinder and in locking position enters apertures in the steering column. As such apertures can be provided in the steering column only in a limited number, the steering wheel must be rotated by a certain amount until the locking bolt snaps into one of the apertures. For this reason, the locking bolt is subjected to a strong force and the driver must exert a high torque when he desired to unlock the lock. Besides, the lock can be opened in that the steering wheel is forcibly rotated.

Other locks comprise a disc, which is mounted on the steering column and formed with apertures for receiving the locking bolt. That lock can be opened in that the steering column can be axially moved to force the locking bolt out of the apertures.

To eliminate the disadvantages of the abovementioned prior art, German Offenlegungsschrift No. 27 39 393 propose a lock comprising a safety hood, which is secured to the underside of the steering wheel hub and includes a cylinder part, which is concentric to the steering column and has apertures for receiving the locking nose of a bolt of the lock. This arrangement has the disadvantage that the locking nose can be forced by simple means out of the apertures so that the joint can be forcibly released.

It is an object of the invention to provide between the steering wheel hub and a bolt a joint which cannot be forcibly released from the outside.

This object is accomplished in that the steering wheel hub is a diecast and on the side facing the steering column is pot-shaped and has a cylindrical flange that is concentric to the steering column and is provided on its inside peripheral surface with axial grooves, and a ring, e.g., a metal ring, which is mounted in front of the grooves on the side remote from the steering wheel hub and firmly connected to the lands between the grooves.

The ring which can be metal is screw-connected or riveted or secured with notched nails.

The ring consists preferably of steel and is pressed into a peripheral groove formed in the end faces of the lands.

BRIEF DESCRIPTION OF DRAWING

A suitable embodiment is shown on the drawing, in which.

DESCRIPTION OF SPECIFIC EMBODIMENT

Figure 1:
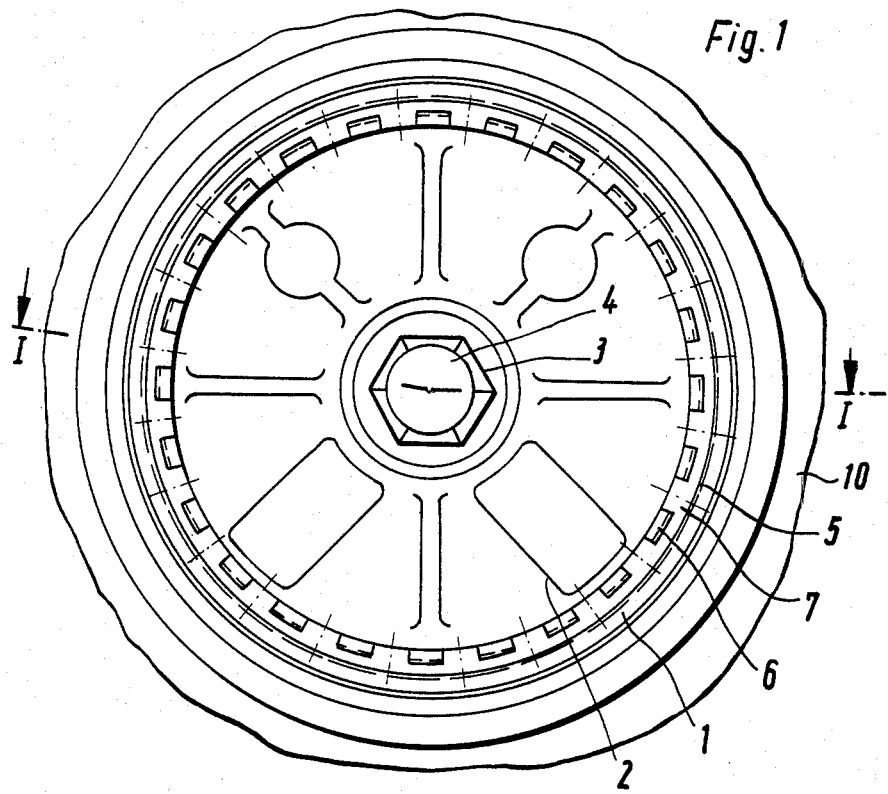
FIG. 1 is a top plan view showing the underside of the hub of the steering wheel and FIG. 2 is a longitudinal sectional view taken on section line I—I in FIG. 1.
Figure 2:
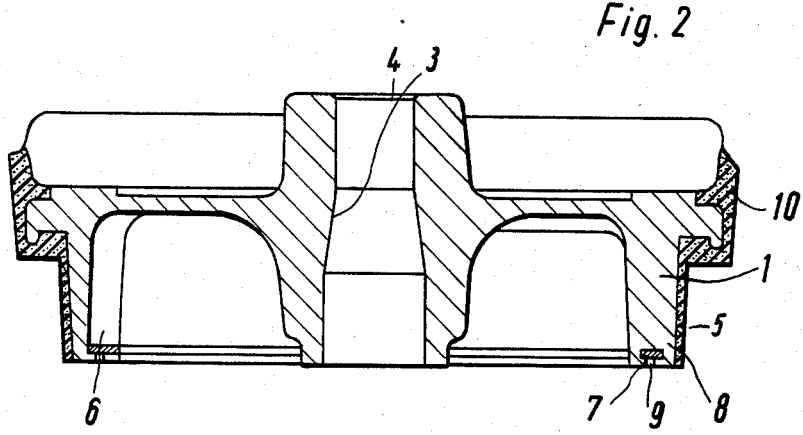

The spokes 2 of the steering wheel are embedded in the diecast hub 1. The hub is formed at its center with an opening 4, which has a hexagonal cross-sectional portion 3 and with which the hub can be fitted on the steering column. Axial grooves 6 which are regularly spaced apart are provided on the inside of the flange 5, which is integrally connected to the underside of the hub, and are closed at their end faces by a steel ring 7. The latter is pressed into a groove 9, which is formed in the end faces of the lands 8 provided between the grooves 6. The periphery of the hub is coated with a polyurethane foam layer 10. The ring 7 is inserted in a peripheral groove 9 disposed in the end faces of the lands 8 between the axial grooves.

The advantage afforded by the invention resides in that the lock according to the invention cannot be opened from the outside and the steering wheel when locked to the steering column cannot be pulled from the latter.

What is claimed is:

1. A steering wheel of the type connected to a steering column and which is engageable by a locking bolt movable by a locking cylinder to lock said steering wheel with respect to said column, wherein said steering wheel comprises a diecast steering wheel hub which has a central opening and one side of which faces a steering column during use, said one side being concave and having a cylindrical flange attached thereto and having a free end, said cylindrical flange being concentric to said central opening and having means including lands provided on its inside peripheral surface forming a multiplicity of axial grooves for receiving a locking bolt, each of said axial grooves extending to the free end of the flange, and a ring disposed at the free end of the flange and facing the axial grooves and firmly connected to said lands.

* * * * *